*(12)* United States Patent
Zhang et al.

(10) Patent No.: US 11,826,634 B2
(45) Date of Patent: Nov. 28, 2023

(54) POWER-DRIVEN SHOE DEVICE WHEEL CONFIGURATION WITH COMBINED TRANSLATIONAL AND ROTATIONAL HINGE MECHANISM AND INTEGRATED GEAR-BUSHING ASSEMBLY

(71) Applicant: Shift Robotics, Inc., Austin, TX (US)

(72) Inventors: Xunjie Zhang, Pittsburgh, PA (US); Abram Pleta, Washington, PA (US)

(73) Assignee: Shift Robotics, Inc., Austin, TX (US)

( * ) Notice: Subject to any disclaimer, the term of this patent is extended or adjusted under 35 U.S.C. 154(b) by 0 days.

(21) Appl. No.: 17/507,270

(22) Filed: Oct. 21, 2021

(65) Prior Publication Data

US 2022/0118345 A1 Apr. 21, 2022

Related U.S. Application Data

(60) Provisional application No. 63/094,738, filed on Oct. 21, 2020.

(51) Int. Cl.
*A63C 17/12* (2006.01)
*A63C 17/20* (2006.01)
*A63C 17/04* (2006.01)

(52) U.S. Cl.
CPC .............. *A63C 17/12* (2013.01); *A63C 17/04* (2013.01); *A63C 17/20* (2013.01); *A63C 2203/12* (2013.01)

(58) Field of Classification Search
CPC ......... A63C 17/12; A63C 17/04; A63C 17/20; A63C 2203/12; A63C 17/0073; A63C 17/262
See application file for complete search history.

(56) References Cited

U.S. PATENT DOCUMENTS 833,100 A 10/1906 Wells
1,672,700 A 6/1928 Vass
(Continued)

FOREIGN PATENT DOCUMENTS

CN 2387937 Y * 7/2000
CN 2497835 Y * 8/2001
(Continued)

OTHER PUBLICATIONS

International Search Report and Written Opinion for PCT/CN2017/000499 dated Oct. 20, 2017.
(Continued)

*Primary Examiner* — James A Shriver, II
*Assistant Examiner* — Michael T. Walsh
(74) *Attorney, Agent, or Firm* — DLA Piper LLP (US)

(57) ABSTRACT

Disclosed is a power-driven shoe. The shoe includes a shoe sole having a plurality of rotatable wheels arranged below the shoe sole in an overlapping fashion. The distance between the rotational axis of the wheels is less than or equal to the diameter of the wheel, such that vertical obstacles can be overcome in both the positive and negative displacement directions for increased ground stability. The shoe sole includes a toe part and a sole part that are connected to each other, via a hinge, in both a rotational and translational configuration, such that at least one front wheel or at least one middle wheel are independently in contact with the ground while maintaining at least one rear wheel in contact with the ground throughout a bi-pedal gait cycle, allowing for comfort during a user's natural range of motion.

13 Claims, 6 Drawing Sheets

(56) References Cited

U.S. PATENT DOCUMENTS

| | | | |
|---|---|---|---|
| 1,801,205 A | 4/1931 | Mirick | |
| 2,857,008 A | 10/1958 | Pirrello | |
| 3,114,562 A | 12/1963 | Goodman | |
| 3,392,986 A | 7/1968 | Ryan | |
| 4,150,499 A | 4/1979 | Wang | |
| 4,334,690 A | 6/1982 | Klamer et al. | |
| 4,417,737 A | 11/1983 | Suroff | |
| 4,553,767 A | 11/1985 | Robjent et al. | |
| RE32,346 E | 2/1987 | Klamer et al. | |
| 4,932,676 A | 6/1990 | Klamer | |
| 5,056,802 A | 10/1991 | Piotrowski | |
| 5,088,748 A * | 2/1992 | Koselka | A63C 17/1436 188/29 |
| 5,236,058 A | 8/1993 | Yamet et al. | |
| 5,398,970 A | 3/1995 | Tucky | |
| 5,400,484 A | 3/1995 | Gay | |
| 5,413,380 A | 5/1995 | Fernandez | |
| 5,511,824 A | 4/1996 | Kim | |
| 5,561,919 A | 10/1996 | Gill | |
| 5,730,241 A | 3/1998 | Shyr et al. | |
| 5,797,466 A | 8/1998 | Gendle | |
| 6,042,123 A * | 3/2000 | Eck, Sr. | A63C 17/04 280/11.221 |
| 6,059,062 A | 5/2000 | Staelin et al. | |
| 6,120,039 A | 9/2000 | Clementi | |
| 6,322,088 B1 | 11/2001 | Klamer et al. | |
| 6,425,587 B1 | 7/2002 | Moon | |
| 6,497,421 B1 | 12/2002 | Edgerley et al. | |
| 6,517,091 B1 | 2/2003 | Fisher et al. | |
| 6,645,126 B1 | 11/2003 | Martin et al. | |
| 7,093,839 B2 * | 8/2006 | Anderson | A63C 17/04 301/5.301 |
| 7,163,210 B1 | 1/2007 | Rehkemper et al. | |
| 7,204,330 B1 | 4/2007 | Lauren | |
| 9,027,690 B2 | 5/2015 | Chavand | |
| 9,295,302 B1 * | 3/2016 | Reed | A43B 3/128 |
| 9,925,453 B1 * | 3/2018 | Tuli | A43C 19/00 |
| 10,456,698 B2 | 10/2019 | Chen et al. | |
| 10,709,961 B2 | 7/2020 | Zhang et al. | |
| 10,933,298 B2 | 3/2021 | Zhang et al. | |
| 10,933,299 B2 * | 3/2021 | Zhang | A63C 17/04 |
| 2001/0022433 A1 | 9/2001 | Chang | |
| 2003/0047893 A1 | 3/2003 | Pahis | |
| 2003/0141124 A1 | 7/2003 | Mullet | |
| 2004/0239056 A1 | 12/2004 | Cho et al. | |
| 2005/0046139 A1 | 3/2005 | Guan | |
| 2005/0082099 A1 | 4/2005 | Tuli | |
| 2005/0121862 A1 | 6/2005 | Walker | |
| 2006/0027409 A1 | 2/2006 | Adams et al. | |
| 2007/0090613 A1 | 4/2007 | Lyden | |
| 2007/0273110 A1 | 11/2007 | Brunner | |
| 2008/0093144 A1 | 4/2008 | Manor | |
| 2008/0313928 A1 * | 12/2008 | Adams | A63C 17/0046 36/35 R |
| 2009/0120705 A1 | 5/2009 | McKinzie | |
| 2010/0207348 A1 | 8/2010 | Othman | |
| 2012/0285756 A1 | 11/2012 | Treadway | |
| 2013/0025955 A1 | 1/2013 | Chavand | |
| 2013/0123665 A1 | 5/2013 | Mariani et al. | |
| 2013/0226048 A1 | 8/2013 | Unluhisarcikli et al. | |
| 2013/0274640 A1 | 10/2013 | Butters et al. | |
| 2013/0282216 A1 | 10/2013 | Edney | |
| 2014/0196757 A1 | 7/2014 | Goffer | |
| 2015/0196403 A1 | 7/2015 | Kim et al. | |
| 2015/0196831 A1 | 7/2015 | Treadway et al. | |
| 2015/0352430 A1 | 12/2015 | Treadway et al. | |
| 2016/0045385 A1 | 2/2016 | Aguirre-Ollinger et al. | |
| 2016/0058326 A1 | 3/2016 | Winfree et al. | |
| 2016/0113831 A1 | 4/2016 | Hollander | |
| 2016/0250094 A1 | 9/2016 | Amundson et al. | |
| 2016/0331557 A1 | 11/2016 | Tong et al. | |
| 2017/0055880 A1 | 3/2017 | Agrawal et al. | |
| 2017/0181917 A1 | 6/2017 | Ohta et al. | |
| 2017/0182397 A1 | 6/2017 | Zhang | |
| 2017/0259162 A1 | 9/2017 | Mo | |
| 2017/0259811 A1 | 9/2017 | Coulter et al. | |
| 2017/0296116 A1 | 10/2017 | McCarthy et al. | |
| 2018/0008881 A1 | 1/2018 | Mo | |
| 2018/0015355 A1 | 1/2018 | Desberg et al. | |
| 2018/0333080 A1 | 11/2018 | Malawey et al. | |
| 2019/0061557 A1 | 2/2019 | Quick et al. | |
| 2019/0184265 A1 | 6/2019 | Micacchi | |
| 2019/0314710 A1 | 10/2019 | Zhang et al. | |
| 2019/0351315 A1 | 11/2019 | Li | |
| 2020/0000373 A1 | 1/2020 | Agrawal et al. | |
| 2020/0061444 A1 | 2/2020 | Zhang et al. | |
| 2020/0061445 A1 | 2/2020 | Zhang et al. | |
| 2020/0129843 A1 | 4/2020 | Zhang et al. | |
| 2020/0129844 A1 | 4/2020 | Zhang et al. | |
| 2020/0147477 A1 | 5/2020 | Park | |
| 2020/0197786 A1 * | 6/2020 | Artemev | A63C 17/08 |
| 2021/0015200 A1 | 1/2021 | Tuli | |
| 2021/0113914 A1 * | 4/2021 | Zhang | B60L 7/26 |
| 2021/0322859 A1 | 10/2021 | Zhang et al. | |

FOREIGN PATENT DOCUMENTS

| | | | |
|---|---|---|---|
| CN | 2759524 Y * | 2/2006 | |
| CN | 2759524 Y | 2/2006 | |
| CN | 201423154 Y | 3/2010 | |
| CN | 201551815 U * | 8/2010 | |
| CN | 201565096 U | 9/2010 | |
| CN | 101912680 A | 12/2010 | |
| CN | 101912681 A | 12/2010 | |
| CN | 102167117 A | 8/2011 | |
| CN | 102805928 A | 12/2012 | |
| CN | 203389316 U | 1/2014 | |
| CN | 104689559 A | 6/2015 | |
| CN | 204364838 U | 6/2015 | |
| CN | 204395401 U * | 6/2015 | |
| CN | 204395401 U | 6/2015 | |
| CN | 105214299 A | 1/2016 | |
| CN | 106039689 A | 10/2016 | |
| CN | 205627021 U | 10/2016 | |
| CN | 106390428 A | 2/2017 | |
| CN | 106390430 A | 2/2017 | |
| CN | 106582003 A | 4/2017 | |
| CN | 207523350 U * | 6/2018 | B60C 7/102 |
| EP | 0686412 A2 | 12/1995 | |
| EP | 0834337 A2 | 4/1998 | |
| EP | 0894515 A1 | 2/1999 | |
| EP | 3629925 A1 | 4/2020 | |
| GB | 2452563 A | 3/2009 | |
| JP | 2005081038 A | 3/2005 | |
| JP | 2013111118 A | 6/2013 | |
| TW | M246189 U * | 10/2004 | |
| WO | 2011092443 A2 | 8/2011 | |
| WO | WO-2011092443 A2 * | 8/2011 | A63C 17/12 |
| WO | 2018082192 A1 | 5/2018 | |
| WO | 2018082193 A1 | 5/2018 | |
| WO | 2018082194 A1 | 5/2018 | |
| WO | 2018082195 A1 | 5/2018 | |
| WO | 2019014152 A1 | 1/2019 | |
| WO | 2019014154 A1 | 1/2019 | |
| WO | 2019212995 A1 | 11/2019 | |
| WO | WO-2019212995 A1 * | 11/2019 | A61B 5/112 |
| WO | 2020146680 A1 | 7/2020 | |

OTHER PUBLICATIONS

International Search Report and Written Opinion for PCT/CN2017/000501 dated Nov. 3, 2017.

International Search Report and Written Opinion for PCT/CN2017/000502 dated Oct. 13, 2017.

International Search Report and Written Opinion for PCT/US2018/041343 dated Sep. 7, 2018.

International Search Report and Written Opinion for PCT/US2018/041345 dated Sep. 7, 2018.

International Search Report and Written Opinion for PCT/US2019/029742 dated Aug. 26, 2019.

International Search Report and Written Opinion for PCT/CN2017/000500 dated Oct. 20, 2017.

(56) References Cited

OTHER PUBLICATIONS

International Search Report and Written Opinion for PCT/US2020/012992 dated Apr. 1, 2020.
European Supplementary Search Report for EP18831335.7 dated Feb. 3, 2021.
International Search Report and Written Opinion for PCT/US2021/056014 dated Jan. 18, 2022.

\* cited by examiner

POWER-DRIVEN SHOE DEVICE WHEEL CONFIGURATION WITH COMBINED TRANSLATIONAL AND ROTATIONAL HINGE MECHANISM AND INTEGRATED GEAR-BUSHING ASSEMBLY

CROSS-REFERENCE TO RELATED APPLICATIONS

This application claims priority to and benefit of U.S. Provisional Application Ser. No. 63/094,738, filed Oct. 21, 2020, entitled "Power-driven shoe device wheel configuration with combined translational and rotational hinge mechanism and integrated gear-bushing assembly," which is incorporated herein by reference in its entirety.

TECHNICAL FIELD

The present application relates to a power-driven shoe device with a multi-wheel configuration, a wheel design with localized deformation zones, a combined translational and rotational hinge device, a heel cushioning mechanism, an integrated gear-bushing assembly, and a one-piece power module suitable for a variety of uses, including, but not limited to the field of transportation tools.

BACKGROUND

With increasing urban populations and concerns of disease transmission on shared commuting methods, such as public transportation, the last kilometer problem, that is, a relatively long and time-consuming final walking distance remains an issue for the commuting public. Various solutions exist, on the market, to improve the last kilometer problem including electric powered transportation devices, such as electric roller skates.

The current market solutions of electric roller skates present a problem, namely a non-bending sole, or platform, whereby the user cannot keep a normal walking posture and gait cycle, from the heels touching the ground to the forefoot parts pedaling the ground. Abnormal posture and gait cycle creates discomfort and causes extra physical exertion. These issues are compounded by the increasing complexity of urban roads and sidewalks where commuters must enter and exit sidewalks while avoiding obstacles such as holes, grates, or puddles. This complexity makes the user unable to walk normally in electric roller skates, thereby greatly reducing the practicality of the current technology. Current wheel configurations that are under the users sole present challenges when going over obstacles and present dangerous scenarios of sudden deceleration or unexpected stopping. The bulk of the electronic equipment required to drive and a transportation device reduces the applicability and ergonomic use due to increased weight and width. As such, the skates may impact each other or obstacles. Furthermore, with the recent appearance of multi-body electric roller skates, the hinge point creates undesirable compression of the user's foot and allows for a source of instability at certain angles of the foot relative to the ground plane, whereby the number of wheels in contact with the ground is suddenly reduced.

SUMMARY

This summary is provided to comply with 37 C.F.R. § 1.73, requiring a summary of the invention briefly indicating the nature and substance of the invention. It is submitted with the understanding that it will not be used to interpret or limit the scope or meaning of the present disclosure.

A power-driven shoe is provided. The power-driven shoe includes a shoe sole that comprises a sole portion and a toe portion, a plurality of rotatable wheels disposed below the shoe sole, a motor disposed below the shoe sole, and a gearbox housing disposed below the shoe sole. The motor is in driving connection with the at least one of the rotatable wheels.

According to certain embodiments, the plurality of wheels are arranged below the shoe sole in an overlapping fashion.

According to certain embodiments, the distance between the rotational axis of the plurality of rotatable wheels is less than or equal to the diameter of the plurality of rotatable wheels.

According to certain embodiments, the sole portion and the toe portion are connected by one or more hinges.

According to certain embodiments, the plurality of rotatable wheels are grouped as front wheels, rear wheels and middle wheels, and wherein the front wheels are disposed below the toe portion.

According to certain embodiments, the one or more hinges are configured to allow rotational and translational movement between the sole portion and the toe portion, wherein the front wheels are independently in contact with the ground at certain angles formed between the sole portion and the ground while maintaining a minimum of one rear wheel throughout a bi-pedal gait cycle.

According to certain embodiments, the one or more hinges comprise two hinges.

According to certain embodiments, the sole portion comprises a heel portion, wherein the heel portion comprises a shock absorption material.

According to certain embodiments, the shock absorption material comprises at least one of a foam, an elastomer, or a spring.

According to certain embodiments, the plurality of rotatable wheels comprise airless tires with local deformation zones.

According to certain embodiments, the gearbox housing comprises a geared drivetrain system, wherein the geared drivetrain system comprises bushings integrated into at least one drive gear.

According to certain embodiments, the power-driven shoes further comprise a power module, wherein the power module comprises a battery and circuitry components.

According to certain embodiments, the circuitry components comprise a control circuit, one or more sensors, and a wireless communication adapter.

According to certain embodiments, the power-driven shoes further comprise a strapping mechanism disposed above the shoe sole configured to secure a user's foot to the shoe sole.

According to certain embodiments, the strapping mechanism comprises a magnetic buckle.

BRIEF DESCRIPTION OF THE DRAWINGS

The aspects and embodiment of this application are depicted in the figures, wherein.

DETAILED DESCRIPTION

Figure 1A:
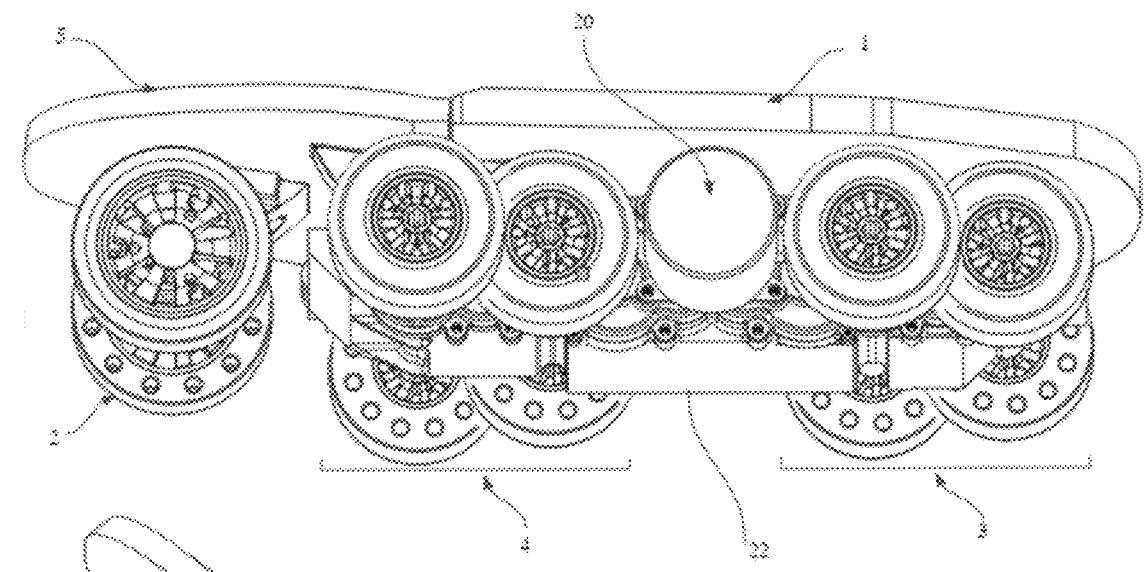
FIG. 1A is a perspective view of the underside of the power-driven shoe which depicts the shoe sole, the toe portion of the sole and the power-driven wheel structure groups mounted on the underside of both the shoe sole and the toe portion, which are separate structures, in accordance with an embodiment.

This disclosure is not limited to the particular systems, devices and methods described, as these may vary. The terminology used in the description is for the purpose of describing the particular versions or embodiments only, and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

The present disclosure provides the structural elements necessary for a power-driven shoe capable of overcoming obstacles, through wheel placement, while allowing for long-term comfort, through the use of a translating and rotatable hinge. Furthermore, the power-driven shoe features an integrated bushing and gear assembly allowing for a reduction in the width of the gearbox assembly.

With respect to the usability issues discussed above, the present disclosure provides a hinge design that rotates about an offset center point while providing translational movement between at least two portions of a shoe sole. In some embodiments, the hinge configuration allows for non-fixed geometries of the power-driven shoe with flexure at, but not limited to, the ball of the foot and the toe region. In some embodiments, the hinge configuration ensures contact between the ground surface and at least one of the plurality of the wheels that are mounted under the shoe sole. In some embodiments, the distance between a central point of rotation of the hinge and a central point of the at least one wheel is configured to ensure contact between the ground surface and the at least one wheel. In some embodiments, the relationship between the wheel diameter and the radius at which the hinge translates is based on the distance between a central point of rotation of the hinge and a central point of the at least one wheel. This relationship may ensure ground stability and contact. Ground stability and contact enables the user to walk using a conventional posture and gait, which in turn allows for extended, comfortable use and rapid mastery of the power-driven shoe for transportation.

In certain embodiments, a motor is connected to an underside of the sole, which drives the plurality of rotatable wheels. In some embodiments, a transmission device, which is connected to the motor, provides a torque multiplier for the motor to allow for locomotion. In some embodiments, the transmission device drives only one group of wheels, such as a middle group of wheels or a rear group of wheels. In other embodiments, the transmission device drives both the middle and rear groups of wheels simultaneously. Both embodiments allow for increased walking speed with reduced physical exertion.

In certain embodiments, a portion of the shoe sole comprises a mechanism that dampens shock during a heel strike portion of a gait cycle. In some embodiments, the dampener may comprise a separate deformable plate. In some embodiments, the dampener may comprise a material connected to the the power-driven shoe sole, which actuates about an axis with motion constrained by a damping material. In some embodiments, the damping material may include, without limitation, a foam, a spring, and/or a frictional mechanism.

In certain embodiments, the wheels of the power-driven shoe may comprise an airless, one-piece design. Such a wheel design may be configured to further reduce an amount of energy transmitted from an impact of the gait cycle. Such a wheel design may also be configured to reduce vibration during use. In some embodiments, an airless tire may include a hub portion that enables motion and torque transfer between the tire and a gearbox assembly. In some embodiments, the airless tire comprises a relatively low durometer elastomer to provide traction and damping. In some embodiments, the airless tire comprises local deformation zones in the elastic region to dampen the vibration and impact energy to the hub, drivetrain and to the user. Utilizing a one-piece construction may simplify manufacturing and provide long-term reliability with reduced maintenance for a user. In some embodiments, the local deformation zones may reduce vibration, thereby increasing stability and reducing impact on the user's toe, ankle, knee, and hip joints, which improves long-term comfort, usability and user health.

In certain embodiments, the configuration of the plurality of rotatable wheels mounted under the shoe sole enables traversal of either smooth or rough terrain without excessive deceleration or stoppage. In some embodiments, the configuration of the plurality of rotatable wheels allows the velocity of the power-driven shoe to remain relatively constant over either smooth or rough terrain. In some embodiments, the configuration of the plurality of rotatable wheels is characterized by a distance between the centers of rotation of adjacent wheels in a lengthwise direction (i.e. heel to toe) of the shoe. In some embodiments, the distance between the center points of rotation of two adjacent wheels is less than or equal to the diameter of each of the adjacent wheels.

In some embodiments, the plurality of wheels may be configured as one or more groups. In some embodiments, wheels within a wheel group may be overlapping in a lengthwise direction. In some embodiments, wheels within different wheel groups may be spaced apart by a distance that is greater than the diameter of the wheels in each wheel group. Illustrative wheel groups may exist, for example and without limitation, under the toe, heel and middle of the shoe sole.

In certain embodiments, the configuration of the plurality of rotatable wheels mounted under the shoe sole is characterized by the lateral configuration of the wheels relative to the centerline of the power-driven shoe and the centerline of the wheels. In some embodiments, an outboard heel axle track width may be less than an inboard heel axle. Such a configuration may allow for improved comfort at a heel strike event in a gait cycle without over-rotating the ankle joint. The greater track width may further improve stability at a loading response, or foot flat, portion of the gait cycle. In further embodiments, a similar wheel configuration may be found in a middle wheel group, where an outboard middle axle track width may be greater than an inboard middle axle track width. In such a configuration, the middle wheel group may have the largest track width of any wheel group for the power-driven shoe. Such a configuration may enable a stable transition from the heel rise and throughout a terminal stance phase.

In certain embodiments, the power-driven shoe may further comprise a unified power module which is mounted under the sole of the power-driven shoe. In some embodiments, the unified power module may comprise an independent component that is separate from the gearbox assembly and other structural elements of the shoe. An independent unified power module may allow for efficient manufacturing and assembly methods and reduce the number of parts required to accurately position and fasten circuit boards, sensors, and batteries. In some embodiments, the unified power module is configured to improve the functionality of the power-driven shoe by protecting electronic components from debris and moisture. In some embodiments, the unified power module provides a safety-critical structure to reduce the likelihood of intrusion into the battery compartment. In some embodiments, the unified power module provides structure to reduce battery expansion deformation into the shoe sole.

In certain embodiments, the power-driven shoe further comprises an integrated bushing and gear feature. In such an embodiment, a friction-reducing bushing material is integrated into a gear or a plurality of gears. In some embodiments, the integrated bushing and gear feature allows for compact assembly in terms of the lateral width of the gearbox assembly. In some embodiments, the integrated bushing and gear feature allows for a reduced number of moving parts, therefore increasing the reliability of the system.

The power-driven shoe, as disclosed herein, improves the functionality over the prior art in multiple ways. For example, the coupled translating and rotatable hinge design allows for a more conventional walking posture through reduced pressure on the user's foot as compared to previous designs that forced unsuitable modifications to the user's walking posture. Moreover, the translational motion ensures at least one of the middle wheels is in contact with the ground throughout the gait cycle, thereby providing continuous power transmission and stability. In addition, the heel cushioning mechanism coupled with local deformation in the airless wheel reduces the amount of impact and vibration transferred to the user, which enables long-term comfort and improved user joint health. Further, the overlapping wheel configuration simulates a large rolling radius while enabling the wheels to be placed in a manner compact enough to fit under the sole. The simulated large rolling radius allows the power-driven shoe to overcome obstacles, such as cracks and debris without a loss of traction or speed. Yet another advantage is that the staggered track width of the axles allows for a natural transition from heel to toe without over-rotating the ankle joint of a user. The integrated bushing and gear mechanism also allows for a more narrow gearbox width and increases the driveline efficiency as compared to convention devices. Still further, the power module allows for better manufacturing and assembly methods and battery protection, increasing product quality and safety.

Referring now to FIG. 1A, a power-driven shoe is depicted with a translation hinge that is configured to place the sole 1 and toe portion 5 in a level state, in accordance with an embodiment. The translation hinge 6,7 of the power-driven shoe connects a first portion of the sole 1 to an independent toe portion 5. A group of front wheels 2, rear wheels 3, and middle wheels 4 are disposed below the shoe sole 1 and toe portion 5. A motor 20 and gearbox housing 22 is also disposed below the shoe sole 1. In some embodiments, the sole hinge component geometry is related to the axis of rotation of the outboard middle axle and the distance by which the outboard middle axis is mounted below the sole 1. This geometry ensures that at least one of the middle wheels 4 and a front wheel 2 contact the ground throughout a heel-raising portion of the gait cycle.

Figure 1B:
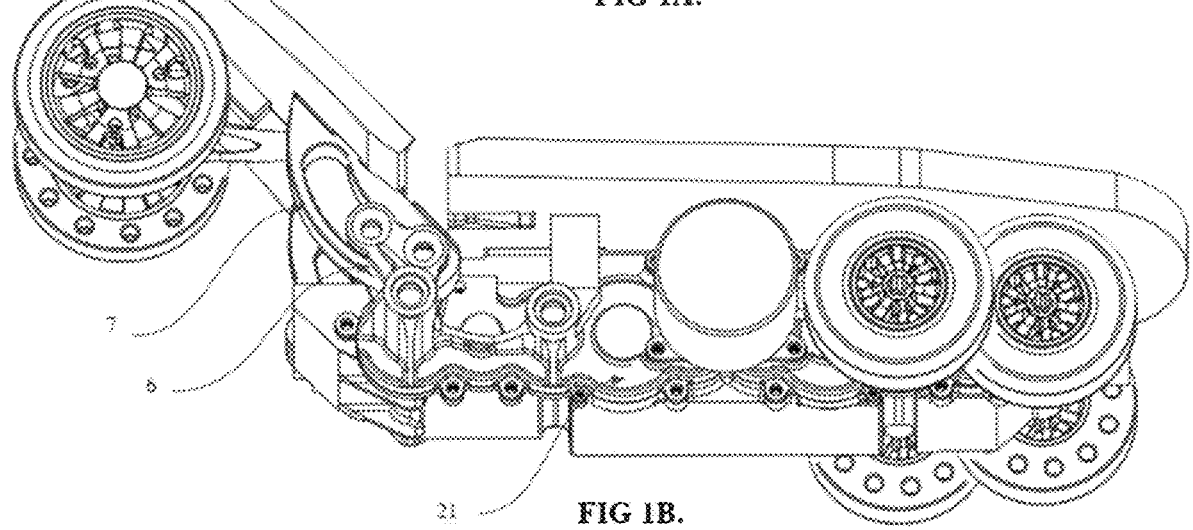
FIG. 1B is a perspective view of a power-driven shoe with the toe portion of the shoe rotated and translated using the hinge showing both the slot on the sole and the slot on the toe portion, in accordance with an embodiment.

With reference to FIG. 1B, the power-driven shoe is depicted in a configuration in which the sole 1 is rotated from the ground plane. The rotation of the sole 1 may be dependent upon the user's gait cycle. The translation hinge component, or knuckle 6, allows the toe portion 5 to rotate and/or translate with respect to the sole potion 1. The translation motion and loads are transferred to the toe component by the translation hinge leaf 7. In some embodiments, a singular translation hinge 6, 7 provides the movement between the shoe sole 1 and the toe portion 5. In other embodiments, a plurality of translation hinges 6, 7 may be provided. For example, two translation hinges 7 may be used to attach the sole portion 1 to the toe portion 5. In such an embodiment, the translation hinges 6, 7 may be attached on either side of a first portion of a gearbox housing 21.

Figure 2A:
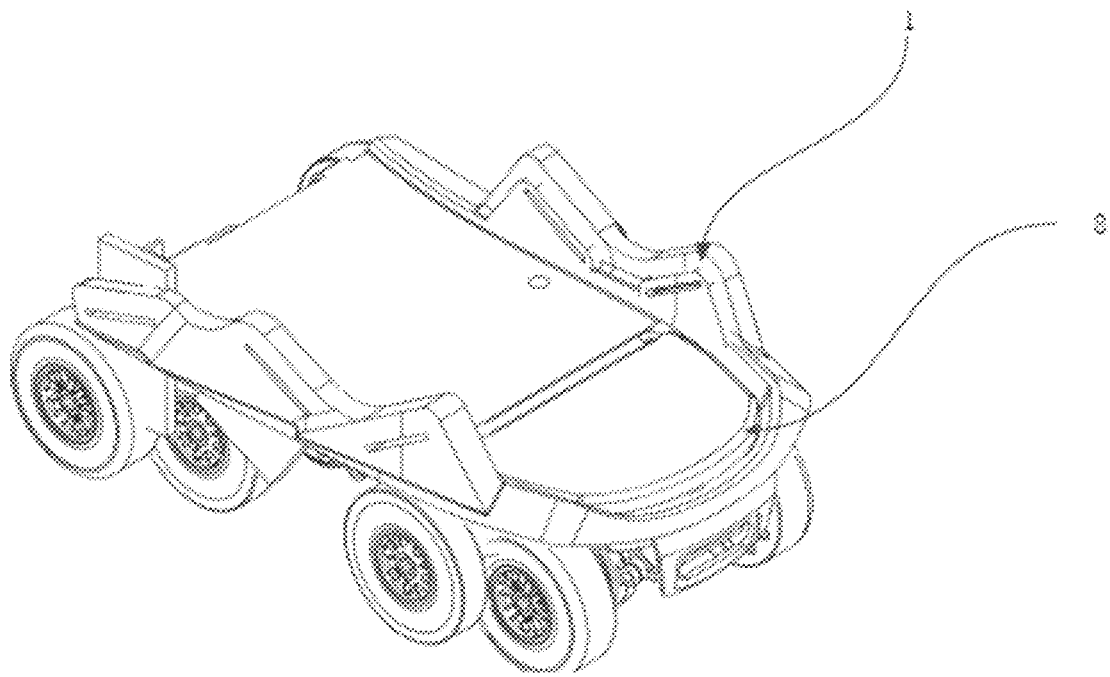
FIG. 2A is a three-quarter view of the sole of the power-driven shoe displaying the heel cushion structure in a raised position, in accordance with an embodiment.

With reference to FIG. 2A, the shoe sole portion 1 of a power-driven shoe is depicted, in accordance with an embodiment. In some embodiments, the shoe sole portion 1 comprises a heel portion 8 which provides shock absorption during the heel strike event of the gait cycle.

Figure 2B:
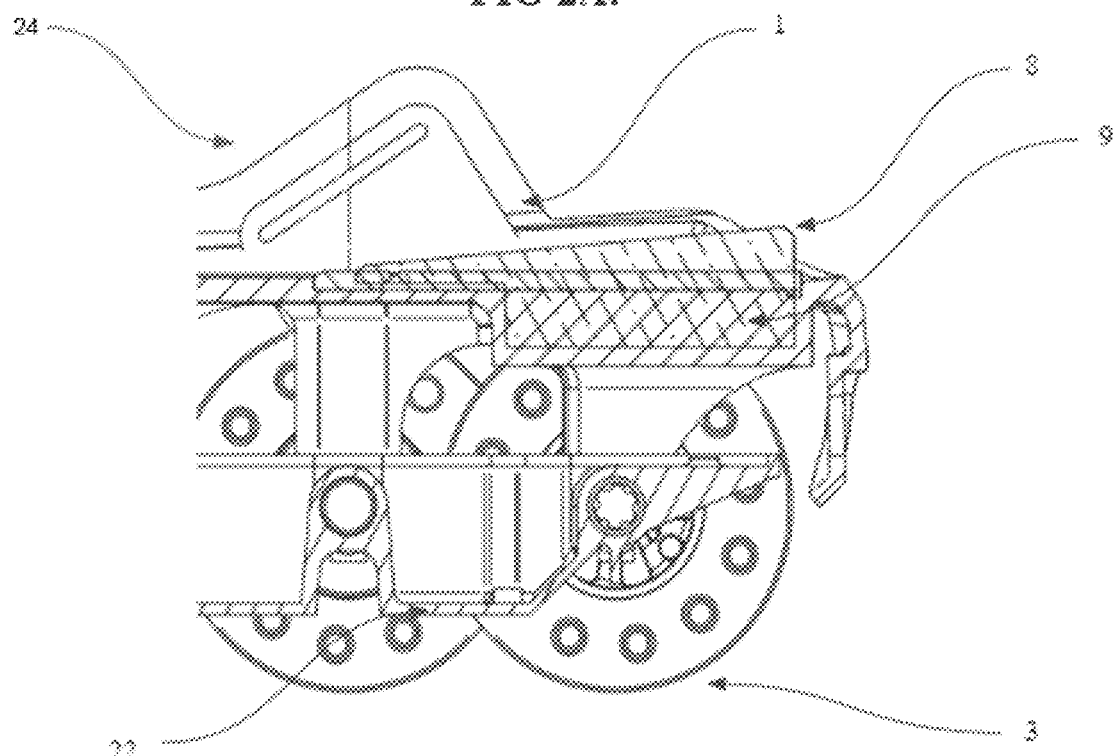
FIG. 2B is a sectional view of a heel cushion structure where the heel cushion structure and the heel cushion damping material can each be seen in relation to the shoe sole, in accordance with an embodiment.

Referring to FIG. 2B, a sectional view of the shoe sole portion 1 is depicted. In some embodiments, the heel portion 8 further comprises a heel cushion damping mechanism 9 which can be constructed from, but not limited to, a foam, an elastomer, a spring and/or other damping devices. In some embodiments, the heel portion 8 may be integrated as a single piece with the shoe sole 1. In alternate embodiments, the heel portion 8 may be a standalone component that is fastened to the sole 1. In certain embodiments, the heel portion 8 is disposed above the rear wheels 3 and a second portion of the gearbox housing 22.

In certain embodiments, a strapping mechanism 24 may be disposed above the sole portion 1. In such embodiments, the strapping mechanism 24 may be configured to accept one or more straps or buckles, thereby allowing the user to attach the power-driven shoe to their foot. In some embodiments, the strapping mechanism 24 may be a magnetic buckle.

Figures 3A, 3B:
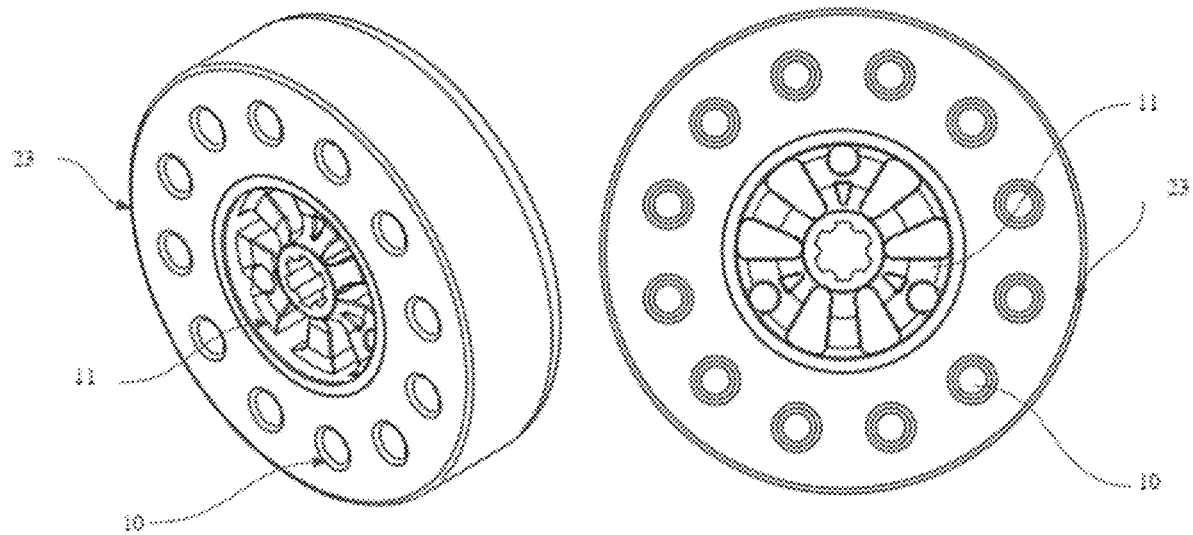
FIG. 3A is a three-quarter view of a wheel element with the hub and local deformation zone, in accordance with an embodiment.
FIG. 3B is a plan view of a wheel element with the hub and local deformation zone, in accordance with an embodiment.
Figure 3C:
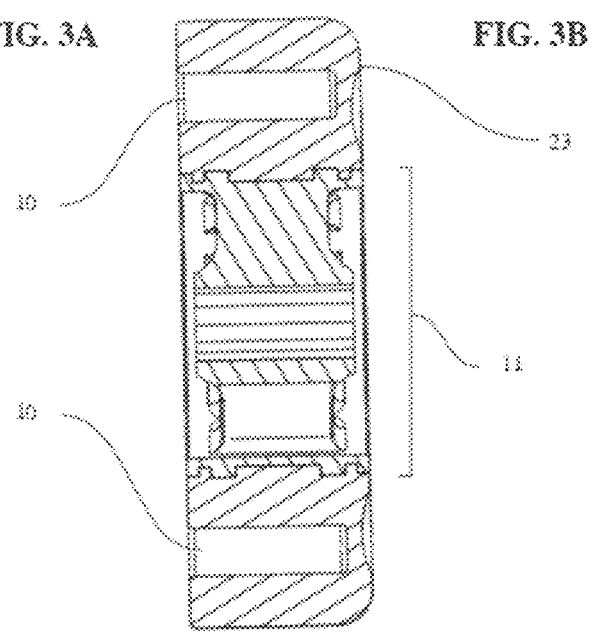
FIG. 3C is a sectional view of a wheel element with the hub and local deformation zone which displays the depth of the deformation zones along the axial length of the wheel element along with the hub portion of the structure, in accordance with an embodiment.

Referring to FIGS. 3A, 3B, and 3C, three views of an airless tire are depicted, in accordance with an embodiment. The airless tire 23 comprises a hub 11 with at least one local deformation zone 10. In some embodiments, the hub 11 may be formed as part of the airless tire 23 in a manufacturing process such that the airless tire and hub are a single component. A depth of each local deformation zone 10 may not exceed a width of the airless tire 23, as shown in FIG. 3C. Having the depth of the local deformation zone 10 be less than the width of the airless tire 23 may permit the use of a higher durometer wheel structure that mimics the deformation and energy absorption of lower durometer wheel structures. A plurality of local deformation zones 10 may be used to reduce vibration transmission to the gearbox and reduce impact energy from obstacles and heel strike events being transmitted to the drive shafts or axles. As such, the user may experience low vibration and impact from the power-driven shoe during use, which may enable longer use and increased stability.

Figure 4:
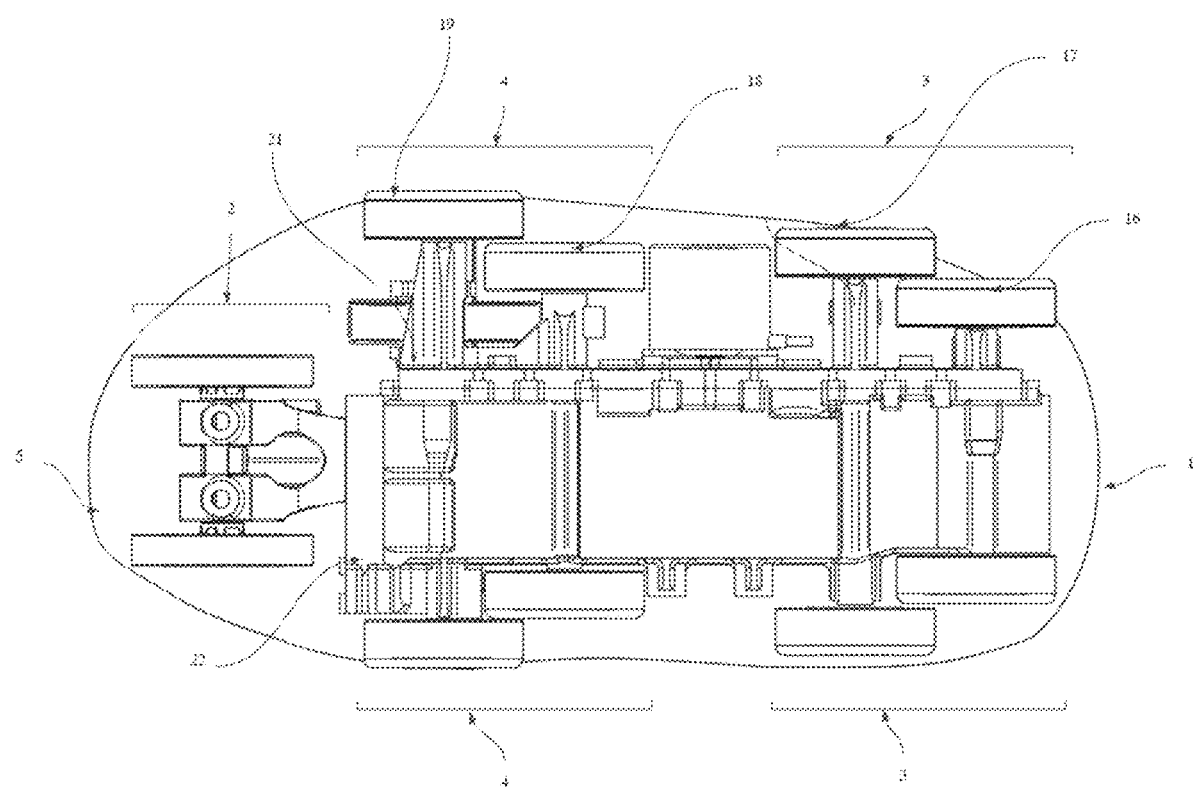
FIG. 4 is a bottom view of a power-driven shoe device, in accordance with an embodiment.

Referring to FIG. 4, a bottom view of a power-driven shoe is depicted, in accordance with an embodiment. In some embodiments, a plurality of rotatable wheels are mounted to the underside of the sole 1 and toe portion 5 of the power-driven shoe device, which can be grouped as front wheels 2, rear wheels 3 and middle wheels 4. In certain embodiments, the rear wheels 3 may be arranged below the shoe sole 1 in an overlapping fashion both axially (as shown in FIG. 4) and longitudinally (as shown in FIG. 1A). In certain embodiments, the middle wheels 4 may be arranged below the shoe sole 1 in an overlapping fashion both axially (as shown in FIG. 4) and longitudinally (as shown in FIG. 1A). The longitudinal overlap may be a function of the distance between the rotational axes of a pair of wheels (such as the rear wheels 3 or the middle wheels 4) being less than or equal to the diameter of at least one wheel. For example, the spacing between the rotational axes may be less than or equal to the diameter of a smallest adjacent wheel. The plurality of rotatable wheels are mounted to axles, wherein at least a portion of the plurality of axles connect to or run through the gearbox assembly, which is contained by a gearbox housing 21, 22.

In certain embodiments, the lateral configuration of the wheels, as related to the track width, comprises offset axle lengths in the rear wheels 3 where the inboard rear axle wheels 17 are spaced outside of the outboard rear axle wheels 16 on both sides of the power-driven shoe. In some embodiments, the axle length of the axle on which the inboard rear axle wheels 17 rotate is greater than or equal to the length of the axle on which the outboard rear axle wheels 16 rotate. In some embodiments, the axle length of the axle on which the inboard rear axle wheels 17 rotate is two times the width of the outboard rear axle wheels 16. In such embodiments, a similar offset space may exist in the middle wheels 4, such that the outboard middle axle wheels 19 rotate outside of the inboard middle axle wheels 18 on both sides of the power-driven shoe, the axle length of the axle on which the outboard middle axle wheels 19 rotate is greater than the axle length of the axle on which the inboard middle axle wheels 18 rotate. In some embodiments, the axle length of the axle on which the inboard rear axle wheels 19 rotate is two times the width of the inboard middle wheels 18.

Figure 5A:
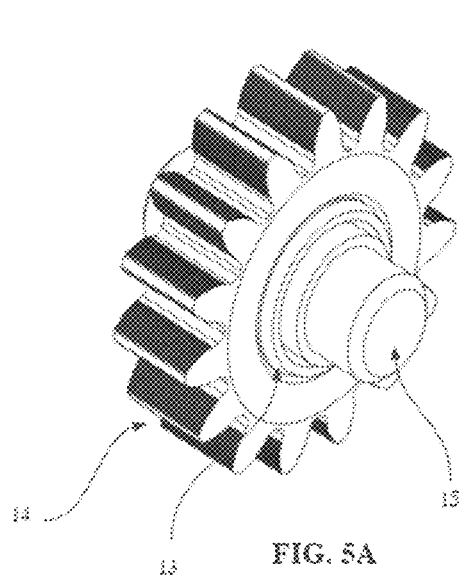
FIG. 5A is a three-quarter view of an integrated bushing-gear component with its relationship to a stationary shaft, in accordance with an embodiment.
Figure 5B:
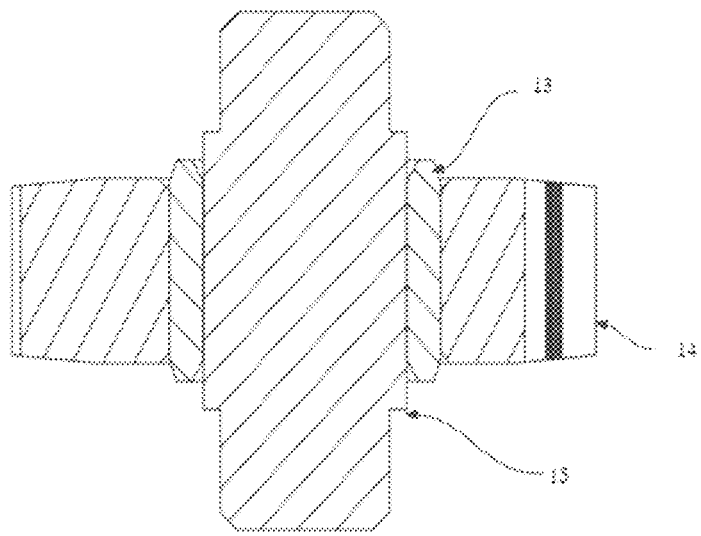
FIG. 5B is a sectional view of an integrated bushing-gear component, in accordance with an embodiment.

Referring to FIG. 5A, a bushing integrated gear 14 is depicted, in accordance with an embodiment. In certain embodiments, the gear comprises a bushing 13 formed as part of the gear 14, such that the bushing and the gear are a single component. In some embodiments, the bushing 13 and gear 14 rotate about an axis determined by a shaft or axle 15. In some embodiments, the axle 15 has an axial length less than three times the gear width. Referring to FIG. 5B, a sectional view of the bushing integrated gear 14 is depicted.

Figure 5C:
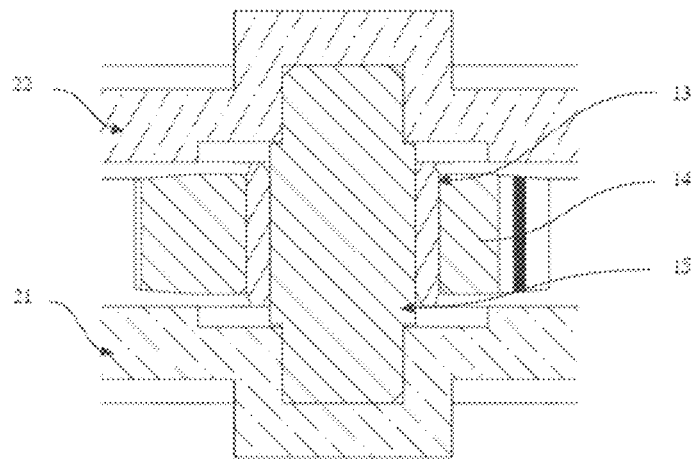
FIG. 5C is a sectional view of the integrated bushing-gear as it is assembled in a gearbox assembly, in accordance with an embodiment.

Referring to FIG. 5C, the bushing integrated gear 14 is depicted within a gearbox housing having, for example, two portions 21, 22. The movement of the axle 15 is constrained by at least one side of a gearbox housing 21, 22.

Figure 6:
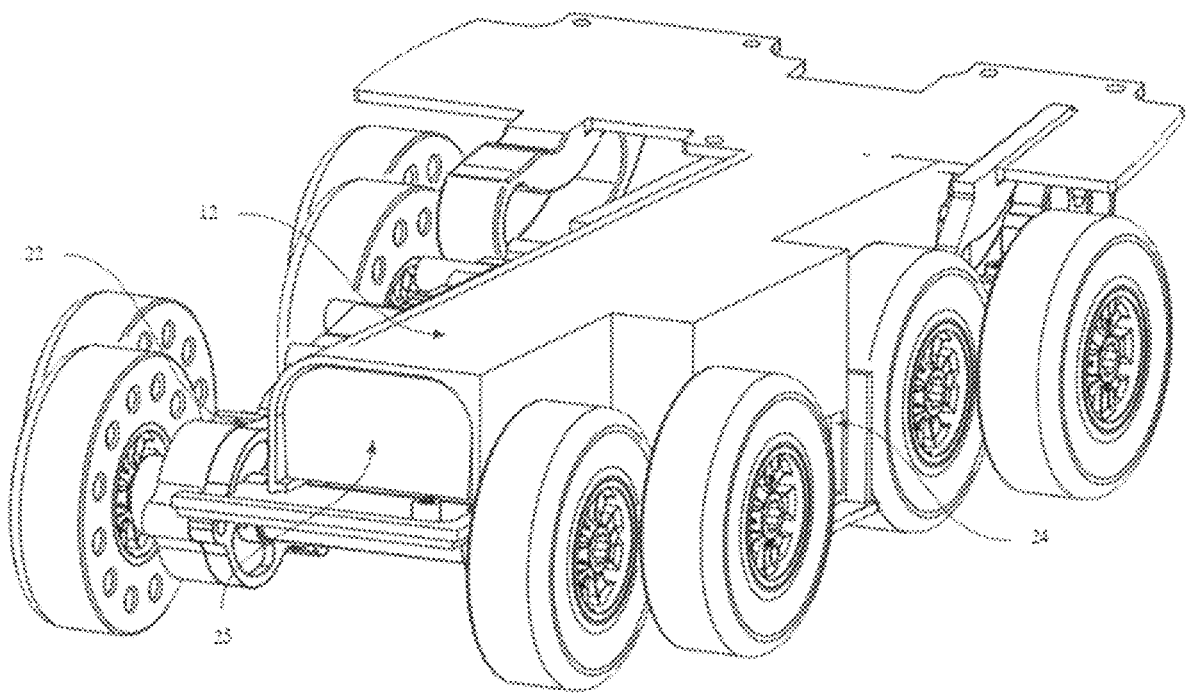
FIG. 6 is a perspective view of components of a power-driven shoe, in accordance with an embodiment.

Referring to FIG. 6, the internal components of the power-driven shoe are depicted, in accordance with an embodiment. In certain embodiments, the power-driven shoe comprises a power module 12, which comprises circuitry components 24, a battery 25, and one or more connections between the circuitry components and the battery. The power module may be mounted inside of the gearbox housing 21, 22. In some embodiments, the power module 12 may constrain movement of the battery 25 and prevent intrusion by outside elements. In some embodiments, the circuitry components 24 may be mounted within the power module 12. In such embodiments, the power module 12 may fixedly hold the position and configuration of the circuitry components 24 during use of the power-driven shoe. The exterior of the power module 12 may further prevent debris and moisture from reaching the circuitry components 24, the battery 25, and/or the connections. In some embodiments, wire routing and movement may be further constrained within the power module 12 to improve the reliability of the power-driven device.

In some embodiments, the circuitry components 24 may comprise a control circuit, one or more sensors, and one or more wireless communication adapters. In some embodiments, at least one of the one or more sensors may be an inertial measurement unit.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A power-driven shoe, comprising:
   a shoe sole comprising a sole portion and a toe portion, wherein the sole portion and the toe portion are connected by one or more hinges configured to allow rotational and translational movement between the sole portion and the toe portion;
   a plurality of rotatable wheels disposed below the shoe sole, wherein at least a portion of the plurality of rotatable wheels are disposed below the shoe sole in an overlapping fashion;
   a motor disposed below the shoe sole, wherein the motor is in driving connection with at least one of the plurality of rotatable wheels; and
   a gearbox housing disposed below the shoe sole.

2. The power-driven shoe of claim 1, wherein the distance between rotational axes of at least one adjacent pair of the plurality of rotatable wheels is less than or equal to a diameter of at least one wheel of the plurality of rotatable wheels.

3. The power-driven shoes of claim 1, wherein the plurality of rotatable wheels comprise front wheels, rear wheels, and middle wheels, and wherein the front wheels are disposed below the toe portion.

4. The power-driven shoe of claim 3, wherein at least one front wheel or at least one middle wheel are independently in contact with the ground while maintaining at least one rear wheel in contact with the ground throughout a bi-pedal gait cycle.

5. The power-driven shoe of claim 1, wherein the one or more hinges comprise two hinges.

6. The power-driven shoe of claim 1, wherein the sole portion comprises a heel portion, wherein the heel portion comprises a shock absorption material.

7. The power-driven shoe of claim 6, wherein the shock absorption material comprises at least one of a foam, an elastomer, or a spring.

8. The power-driven shoe of claim 1, wherein the plurality of rotatable wheels comprise at least one airless tire with one or more local deformation zones.

9. The power-driven shoe of claim 1, wherein the gearbox housing comprises a geared drivetrain system, wherein the geared drivetrain system comprises a bushing integrated into at least one drive gear.

10. The power-driven shoe of claim 1, further comprising a power module, wherein the power module comprises a battery and circuitry components.

11. The power-driven shoe of claim 10, wherein the circuitry components comprise a control circuit, one or more sensors, and a wireless communication adapter.

12. The power-driven shoe of claim 1, further comprising a strapping mechanism disposed above the shoe sole and configured to secure a user's foot to the shoe sole.

13. The power-driven shoe of claim 12, wherein the strapping mechanism comprises a magnetic buckle.

* * * * *